Aug. 21, 1945.   J. A. COMPTON ET AL   2,382,960
PUMP DIAPHRAGM SEAL
Filed June 26, 1943
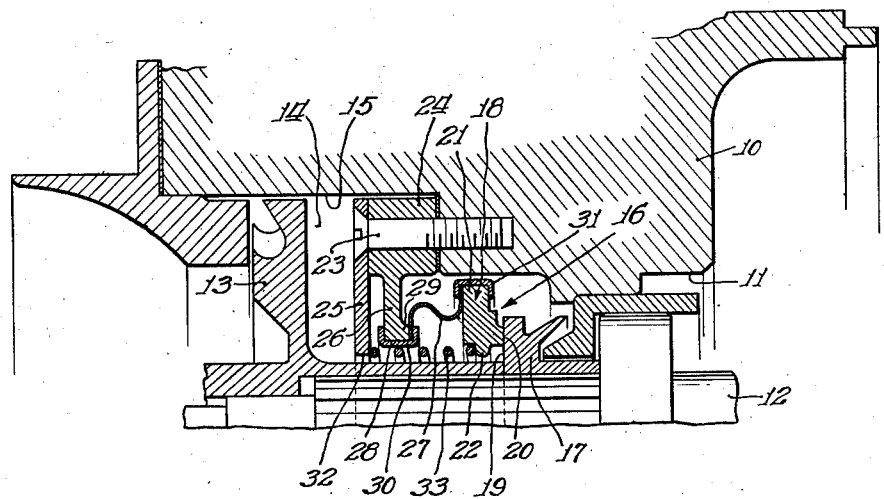
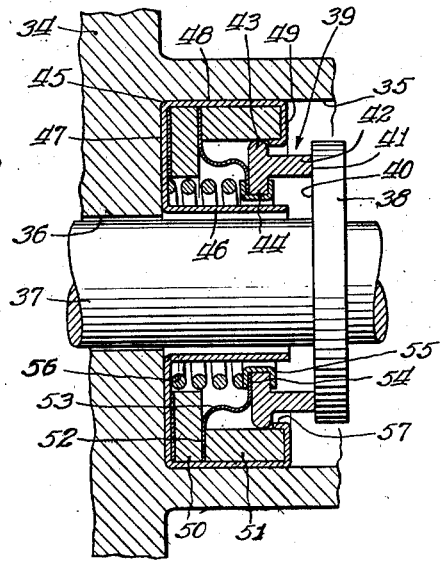
Inventors:
James A. Compton
Albert Paul
By Edward C. Fitzbaugh
Atty.

Patented Aug. 21, 1945

2,382,960

UNITED STATES PATENT OFFICE 2,382,960

PUMP DIAPHRAGM SEAL

James A. Compton, South Euclid, and Albert Paul, Cleveland, Ohio, assignors to Pesco Products Co., a corporation of Ohio Application June 26, 1943, Serial No. 492,380

2 Claims. (Cl. 286—11)

This invention relates to a seal for a chamber wherein part of the chamber is defined by relatively rotatable elements.

For purposes of illustration this invention will be described with reference to its application to a pump for liquid fuel but it is to be understood that the seal may be incorporated in other devices such as power transmitting couplings and torque converters of the vaned type, fluid meters, etc.

The principal object of this invention is to provide a fluid pressure balanced seal between two relatively rotating elements such that the pressure exerted upon the relatively rotating elements is reduced to a point just sufficient to retain the fluid within the desired boundaries and thus reduce wear of the relatively rotating elements.

A more specific object of this invention is to provide a substantially balanced fluid seal which may be transported as a complete unit and which may be readily inserted into or removed from the device with which it is to operate. A still more specific object of this invention is to provide a reliable yet inexpensive means for securing a relatively soft diaphragm to a hard support, the securing means forming a fluid-tight seal between the diaphragm and support.

These and other objects of this invention will become apparent from the following detailed description of the invention when taken together with the accompanying drawing in which:

Fig. 1 is a fragmentary section through a fuel pump in which a seal incorporating this invention is installed; and Fig. 2 is a fragmentary section through an alternative form of seal.

Referring now to Fig. 1 for a detailed description of the invention there is shown a housing 10 having formed therein a central opening 11 through which passes a shaft 12 the right hand end of which (Fig. 1) is secured to a suitable source of power (not shown). Said shaft 12 drives an impeller, a portion of which is shown at 13 and which operates in a chamber 14 filled with the fluid to be pumped. Said chamber 14 is formed mainly by an enlarged opening 15 in housing 10. When shaft 12 rotates, the impeller will operate upon the fluid to create a pressure therein which pressure will be transmitted to all parts of chamber 14 in hydraulic communication with the impeller.

Chamber 14 is sealed in part from the atmospheric pressure obtaining outside housing 10 by means of a seal designated generally by the reference character 16. Said seal is comprised of an abutment 17 fixed to and rotatable with shaft 12 and a ring 18 which is fixed to housing 10 by means hereinafter to be described. Abutment 17 may be in the form of a flange having a substantially radial surface 19 which is perfectly smooth and hard. Ring 18 is provided with a substantially radially disposed surface 20 which bears against surface 19 to form the seal and therefore is likewise perfectly smooth and preferably hard. Ring 18 has a radial extension or flange 21 and a protuberance 22 which may be in the form of a bead extending radially inwardly from the central opening in the ring.

Secured to housing 10 by means of screws 23 or other fasteners are two plates 24 and 25. Plate 24 is reduced in thickness at its inner region 26 so as to be spaced from plate 25 thereat.

Connecting region 26 of plate 24 and flange 21 of ring 18 is a flexible diaphragm 27. It will be observed that region 26 of plate 24 is provided with a central opening 28 the diameter of which is considerably smaller than the outer diameter of flange 21 of ring 18. It will also be observed that inner region 26 is provided with a flange 29 which extends a short distance axially in the direction of diaphragm 27. One end of diaphragm 27 is retained against flange 29 by means of a channel-shaped ring 30 which is initially of an L-section and then spun over to compress diaphragm 27 against flange 29. Similarly the other end of the diaphragm 27 is compressed against flange 21 of ring 18 by means of a channel-shaped ring 31 which is likewise initially of L-section and then spun over to compress the diaphragm against flange 21.

Plate 25 is provided with a smaller opening 32 in the central region thereof so that plate 25 will extend radially inwardly beyond channel-shaped ring 30. A spring 33, supported in part by ring 30 and compressed between plate 25 and protuberance 22 of ring 18, serves to keep ring 18 in contact with abutment 17 on shaft 12 when no fluid pressure is available in chamber 14.

It will be noted that diaphragm 27 is flexible and hence may be expanded radially by the pressure fluid to a greater circumference than that shown. When operating under ordinary working pressures the diaphragm thus will exert an axial force to the left as shown in Fig. 1 which will tend to balance a portion of the pressure tending to move ring 18 to the right and accordingly the net pressure of ring 18 on abutment 17 will be materially reduced, in this manner reducing wear on both ring and abutment.

Referring now to Fig. 2 for a description of another embodiment of this invention the housing is shown at 34 having a small cylindrical chamber 35 communicating by means of a central opening 36 with a pump chamber (not shown). A shaft 37 passes through opening 36 and chamber 35 and is provided with a radially extending flange 38 which forms an abutment for a seal designated generally by the reference character 39. Said flange 38 is provided with a substantially radially disposed surface 40 which contacts a similarly radially disposed surface 41 on a ring 42 to form the seal proper. Said ring 42 is of substantially T-shaped cross-section, one end 43 of the cross-bar of the T being rounded and the other end 44 being substantially rectangular. Pressed into chamber 35 is a sheet metal container 45 having three substantially complete walls 46, 47 and 48 and a radially inwardly extending wall 49 partially closing off the right hand (Fig. 2) side of the container.

Within container 45 are rings 50 and 51 between which is pressed one end 52 of a flexible diaphragm 53. The other end 54 of diaphragm 53 is secured to the cross-bar of ring 42 by means of a channel-sectioned ring 55 which, as in the case of the embodiment shown in Fig. 1, is initially of L-section and then spun over to compress the end 54 of diaphragm 53 against ring 42. A spring 56 bears against wall 47 of container 45 and against ring 55 in order to urge ring 42 against flange 38 to provide a seal when no pressure is available in the pump.

In order to limit the movement of ring 42 to the right (Fig. 2) flange 49 is turned inwardly at 57 to provide a stop. Ring 51 has an inside diameter which is substantially equal to the outside diameter of the cross-bar of ring 42 so that said ring 42 is centered with respect to shaft 37 by means of ring 51. Similarly, ring 50 has an inside diameter which is approximately the same as the outside diameter of spring 56, thereby centering spring 56 with respect to shaft 37.

It will be apparent that since fluid under pressure is present to the right of lower end 44 of the cross-bar of ring 42 as well as to the left hand side thereof, a considerable portion of the pressure exerted by the fluid upon ring 42 will be balanced and that the wear of the contacting surfaces 41 and 42 will be materially reduced.

Since container 45 completely encloses the essential parts of the seal, these parts of the seal can be removed simply by removing container 45 and may then be readily transported or shipped as a complete unit. In both modifications no screws, rivets or other fasteners are used to hold the ends of the diaphragm in their respective places, this being accomplished by means of a channel-shaped ring in the first modification, and in the second modification by such a ring and in addition by container 45, wall 47 and flange 49 of which form an enlarged U which serves to compress rings 50 and 51 against the end 52 of diaphragm 53. In both modifications the total pressure on the sealing ring is reduced by providing a component of force in a direction tending to separate the sealing ring from its abutment. In both modifications the flexibility of the diaphragm permits this type of seal to be used where there is slight misalignment between shafts without destroying the efficacy of the seal.

In the form shown in Fig. 1, it will be noted that diaphragm 27 has a larger effective diameter at its point of attachment to ring 18 than at its point of attachment to flange 29. This difference in diameter, in addition to providing a balancing force on the ring, serves to permit the use of a smaller diameter sealing surface on the ring with a consequent beneficial reduction in rubbing velocity.

It is understood that although the invention has been described with respect to a structure incorporating a ring fixed to a housing and a corresponding abutment on a rotating shaft, that the fixed abutment and ring may be interchanged so that the abutment is on the housing and the ring and associated diaphragm and other necessary elements are on the rotating shaft. It is understood further that the invention is not to be limited to the foregoing illustrative description but is to be determined by the appended claims.

We claim:

1. In a fluid sealing arrangement for a chamber defined in part by a housing and a shaft protruding therefrom, said housing having a stepped portion forming a small auxiliary chamber for receiving said sealing arrangement, said sealing arrangement comprising an abutment carried by said shaft, a first annular ring adapted to make a fluid-tight contact with said abutment, a flexible diaphragm, a toroidal container frictionally retained within said auxiliary chamber, means for fixing one terminal portion of said diaphragm relative to said container including a second annular ring within said container said container having a radially inturned flange portion extending around one axial terminal portion of said second annular ring and forming a retaining protuberance therefor, said first mentioned annular ring having a radially outwardly extending protuberance received snugly within said second named annular ring so as to center said first mentioned ring relative to said shaft, said radially inturned flange portion also functioning to limit the axial movement of said first named annular ring in the outer direction.

2. In a sealing arrangement for a chamber defined in part by a housing and a shaft extending therefrom, said housing having a stepped portion forming a small auxiliary chamber for receiving said sealing arrangement, said sealing arrangement comprising an abutment carried by said shaft, a first annular ring adapted to make a fluid-tight contact with said abutment, a flexible diaphragm, a toroidal container frictionally retained within said auxiliary chamber, means for fixing one terminal of said diaphragm relative to said container comprising a pair of rings one disposed on each side of said diaphragm, said container having a radially inwardly extending flange terminating in an axially extending portion, said flange being effective to exert a compressive force upon said rings for retaining said diaphragm therebetween.

JAMES A. COMPTON.
ALBERT PAUL.